United States Patent

[11] 3,625,927

[72] Inventors Toshio Yoshimoto;
 Seiya Kaneko; Tsuneaki Narumiya; Hiroshi Yoshii, all of Tokyo, Japan
[21] Appl. No. 736,580
[22] Filed June 13, 1968
[45] Patented Dec. 7, 1971
[73] Assignee Bridgestone Tire Company Limited
 Tokyo, Japan
[32] Priority June 21, 1967
[33] Japan
[31] 42/39792

[54] HYDROGENATION CATALYSTS AND A PROCESS FOR HYDROGENATING POLYMERS BY MEANS OF THESE CATALYSTS
 7 Claims, No Drawings
[52] U.S. Cl. .................................................. 260/85.1,
 260/82.1, 260/83.3, 260/94.7, 260/96, 260/690, 252/426, 252/431
[51] Int. Cl. ......................................................... C08d 5/00,
 C08f 1/88, C08f 27/25
[50] Field of Search ............................................ 260/690, 94.7 H, 96 HY, 85.1

[56] References Cited
UNITED STATES PATENTS

| 3,113,986 | 12/1963 | Breslow et al. | 260/683.9 |
| 3,205,278 | 9/1965 | Lapporte | 260/667 |

FOREIGN PATENTS

| 697,780 | 11/1964 | Canada | 260/690 |
| 165,883 | 0/1964 | U.S.S.R. | 260/94.7 |

OTHER REFERENCES

Encyclopedia of Polymer Science & Technology; Interscience 1967, pp. 557– 568, by Moberly Primary Examiner—Joseph L. Schofer
Assistant Examiner—William F. Hamrock
Attorney—Stevens, Davis, Miller & Mosher ABSTRACT: A catalyst for hydrogenating a high molecular weight polymer having hydrogenatable unsaturated bonds, which is suitable for hydrogenation of said polymer in a viscous solution form and comprises a reaction product of (1) a metal chelate compound of nickel, cobalt or iron with (2) an organic metallic reducing agent; in said chelate compound, the chelating agent should be attached to said metal through a pair of a nitrogen atom and an oxygen atom; the hydrogenation process of said polymer by means of said catalyst.

HYDROGENATION CATALYSTS AND A PROCESS FOR HYDROGENATING POLYMERS BY MEANS OF THESE CATALYSTS

The present invention relates to a new hydrogenation catalyst and a process for hydrogenating polymers by means of the catalyst.

In order to hydrogenate polymers having hydrogenatable unsaturated bonds efficiently by the use of ordinary heterogeneous catalysts of reduced metals, such as Raney nickel and nickel kieselguhr, it has been necessary to use a large amount of catalysts, a high reaction temperature of from 150° to 200° C. or higher and a high hydrogen pressure, because a solution of high molecular weight polymers is highly viscous compared with that of low molecular weight compounds. There has been a further demerit that these high temperature hydrogenation conditions cause the degradation of the polymers. Further, these heterogeneous catalysts are not suitable for hydrogenation of the polymers, because they are easily poisoned by impurities which are difficult to be removed from and also it is very difficult to remove such a heterogeneous catalyst residue from the hydrogenated polymers after hydrogenation.

It is an object of this invention, therefore, to provide a new stable catalyst with a high activity suitable for the hydrogenation of the polymers in a viscous solution form.

Another object of the invention is to provide a new process suitable for hydrogenating polymers in a viscous solution form.

A further object of the invention is to provide new hydrogenated polymers suitable for manufacturing the rubber articles.

Other and further objects of the invention will become apparent to those skilled in the art upon consideration of the accompanying disclosure.

We have found that the hydrogenation of polymers having hydrogenatable unsaturated bonds can be carried out by means of the catalyst comprising a reaction product of (1) a metal chelate compound of the metal selected from the group consisting of nickel, cobalt and iron, wherein each chelating agent is attached to said metal through a pair of a nitrogen atom and an oxygen atom, and (2) a metal compound reducing agent.

According to the present invention, the hydrogenation of the polymers in a viscous solution form can be effected at a low temperature, under a low-hydrogen pressure and at a very high rate which has never been obtained. Further, it has been found that the catalyst of the present invention is very stable at a high temperature, has a high reproducibility of the activity and can be easily removed from the hydrogenated polymers after hydrogenation.

The bond character of metal chelate compounds is different from that of ordinary inorganic or organic salts of the metal. The metal chelate compounds often have unexpected chemical or physical properties and it is said that such properties are mainly based on the nature of the coordinate bond formed between the metal and electron donating atoms of chelating agents. The electron donating atoms which can coordinate metals are limited to nitrogen(N), oxygen(O), sulfur(S), etc. and so it is convenient to classify metal chelate compounds by the combination of the electron donating atoms which coordinate the metal. Therefore, a compound which has more than two such electron donating atoms in one molecule and has ability to form metal chelate compounds is generally said to be chelating agent.

The metal chelate compounds used as the catalytic components of the present invention has the chelating agent of which electron donating atoms are combination of a nitrogen atom and an oxygen atom. Those are metal chelate compounds of iron, cobalt or nickel wherein a pair of a nitrogen atom and an oxygen atom of the chelating agent coordinates the metal. Such metal chelate compounds can be expressed by the following formula, wherein M is nickel, cobalt or iron and $n$ is the number of the chelating agents which coordinate M.

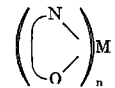

The chelating agents which can form those metal chelate compounds include compounds described below, but such exemplification does not restrict the scope of the chelating agents which can be used as the catalytic components of the present invention.

1. hydroxyquinoline
   8-hydroxyquinoline
   5-methyl-8-hydroxyquinoline
   10-hydroxybenzoquinoline
2. hydroxyoxime
   salicylaldoxime
   2-hydroxy-1-acetophenoneoxime
   α-benzoinoxime
   diacetylmonooxime
   phenanthlenequinonemonooxime
   α-benzilmonooxime
3. nitrosohydroxy aromatic compounds
   o-nitrosophenol
   α-nitroso-β-naphthol
   β-nitroso-α-naphthol
4. 2-hydroxy-1-acetophenoneoxime
   salicylaldehydeimine
   salicylaldehydemethylimine
   salicylaldehydephenylimine
   salicylaldehydebenzilimine
   bis(salicylaldehyde)ethylenediimine
5. aromatic aminoacid
   3-amino-2-naphthoic acid
   quinaldic acid
6. miscellaneous
   o-hydroxybenzilamine The metal chelate compounds of iron, cobalt or nickel which are coordinated by the above described chelating agents are commercially available or easily synthesized by the conventional chemical procedure. The metal chelate compounds are preferably used as anhydrous form when they are reacted with the other catalytic component of the present invention.

The reaction product of iron-, Cobalt- or nickel-chelate compounds of which chelating agent is attached to the metal through a pair of two oxygen atoms with the metal compounds reducing agent of the present invention can be used as the hydrogenation catalyst, but its activity decreases remarkably with the passage of time after preparation. Furthermore, iron-, cobalt- or nickel carboxylates have the similar behavior when used instead of the metal chelate compounds. Such tendency becomes more conspicuous when the catalyst preparation is effected at a high temperature. On the contrary, the catalyst of the present invention is stable for a long time even at a high temperature. This fact shows that stabilities of the catalyst obtained from the metal chelate compound used in the present invention are excellent compared with that of the catalyst obtained from carboxylates or metal chelate compounds of which chelating agent is attached to the metal through a pair of two oxygen atoms. Further, the reaction products of iron-, cobalt- or nickel-chelate compounds of which chelating agent is attached to the metal through a pair of two nitrogen atoms with metal compound reducing agents have extremely a low activity as the hydrogenation catalyst. It is therefore apparent that the high catalytic activity and stability characterized by the present invention are based upon the discovery that the metal chelate compounds of which chelating agent is attached to the metal through a pair of a nitrogen atom and an oxygen atom can be used as the catalytic components of the hydrogenation catalyst. Such unexpected fact cannot be anticipated from the prior art. The catalyst of which activities are stable for a long time is especially suitable for the continuous hydrogenation process when used industrially. In the continuous hydrogenation process, pre-prepared polymer solution may be introduced into the reactor continuously, pre-prepared catalyst obtained by mixing catalytic components may be mixed with the polymer solution continuously, the solution containing the catalyst may be contacted with hydrogen in the reactor continuously and the hydrogenated polymer solution may be recovered continuously. It is therefore preferable that activity of the catalyst once obtained by mixing the catalytic components is stable and does not decrease with the passage of time. Therefore, the catalyst of the present invention which is stable for a long time is suitable for a continuous hydrogenation process. Such merit makes the present invention more valuable.

Another catalytic component of the present invention is a metal compound reducing agent. An organometallic compound of the metal of Group 1, 2 or 3 may be used. The organometallic compounds having the formula of $MR_n$, wherein M is a metal selected from the group consisting of lithium, magnesium and aluminum, R is selected from the group consisting of hydrocarbon radical having from one to 12 carbon atoms, hydrogen and an alkoxy radical having from one to 12 carbon atoms and $n$ is the valence number of M, are preferably used.

The hydrocarbon radical includes an alkyl, aryl, alkaryl, aralkyl, and cycloaliphatic group. Examples of such radicals include methyl, ethyl, n-propyl, i-propyl, n-butyl, i-butyl, sec-butyl, t-butyl, pentyl, hexyl, heptyl, octyl, nonyl, decyl, dodecyl, phenyl, benzyl, tolyl, cyclopentyl, cyclohexyl, and naphthyl radicals. The group combined to oxygen in the alkoxy radical is exemplified as described above too.

Examples of such organometallic compounds include ethyl-lithium, n-propyllithium, i-butyllithium, n-butyllithium, sec-butyllithium, t-butyllithium, n-pentyllithium, phenyllithium, diethylmagnesium, di-n-propylmagnesium, di-n-butylmagnesium, diphenyl-magnesium, triethylaluminium, tri-n-propylaluminium, triisopropylaluminium, tri-n-butylaluminium, triisobutylaluminium, triamylaluminium, trihexylaluminium, trioctylaluminium, tridodecylaluminium, diethylisobutylaluminium, diethyloctylaluminium, tricyclohexylaluminium, triphenylaluminium, didodecylaluminiumhydride, diisobutylaluminiumhydride, diethylaluminiumethoxide, dibutylaluminiumbuthoxide, and their mixtures. In addition to the above-mentioned compounds, the organometallic compounds having two kinds of metals such as lithiumaluminiumtetrabutyl may be used.

The catalyst of the present invention may be obtained by dissolving or dispersing the metal chelate compound in a suitable inert solvent and reacting said metal chelate compound with the metal compound reducing agent. It is possible to mix the catalytic components in the polymer solution to be hydrogenated. Even when the dispersion of the metal chelate compound in an inert solvent is reacted with the metal compound reducing agent, unexpectedly the reaction product is soluble in the inert solvent and homogeneous catalyst solution can be obtained after the reaction. Therefore, the catalyst is soluble in a viscous polymer solution and can make most homogeneous contact with polymers and hydrogen, and then the hydrogenation proceeds rapidly under a mild condition. The temperature for preparation of the catalyst may be varied widely, but when the catalyst prepared at a temperature below room temperature is used, if the hydrogenation reaction begins, the reaction proceeds rapidly, but the induction period occurs in the original stage of the reaction, so that it is preferable to adopt the temperature above room temperature in order to avoid such induction period. The upper limit of the temperature for preparation of the catalyst is restricted by the boiling point of an inert solvent used. Even when the catalyst is prepared at a high temperature about 80° C., the activity of the obtained catalyst is sufficiently high and does not substantially decrease for a long time at such a high temperature. Generally speaking, the viscosity of the polymer solution decreases remarkably as the temperature becomes higher and then the reaction rate of the hydrogenation becomes faster because hydrogen can contact with the polymer solution more easily. Therefore, in the case of the hydrogenation of polymers in a viscous solution form the conduct of the hydrogenation at a higher temperature is desirable so far as the degradation of the polymeric chain does not occur substantially. It can be therefore said that the catalyst of the present invention, which maintains a high catalytic activity for a long time at a high temperature, is especially suitable for the hydrogenation of polymers in a viscous solution form. These merits make the present invention more valuable.

The molar ratios of the metal chelate compound to the metal compound reducing agent may be varied widely. The molar ratios of the metal chelate compound to the metal compound reducing agent of from 1:10 to 1:0.2 may be preferably used. When the molar ratio is below 1:10 or above 1:0.2, the decrease of the activity as the hydrogenation catalyst is observed. Ratios of from 1:8 to 1:0.2 are more preferably used. According to the present invention, the concentration of nickel, cobalt or iron in the catalyst may be 0.1 mmole or more per a liter of polymer solution to be hydrogenated.

As an inert solvent used for preparing the catalyst or dissolving the polymers to be hydrogenated, saturated hydrocarbon, aromatic hydrocarbon, hydroaromatic hydrocarbon, chlorinated aromatic hydrocarbon and ether may be used. Examples of such inert solvents include hexane, heptane, octane, benzene, toluene, xylene, cyclohexane, methylcyclohexane, decalin, tetralin, chlorobenzene, tetrahydrofuran, anisole, dioxane and their mixtures. Among them saturated hydrocarbon, aromatic hydrocarbon and hydroaromatic hydrocarbon are preferably used.

The catalyst of the present invention is used for the hydrogenation of the unsaturated bonds of polymers in a viscous solution form. The hydrogenatable unsaturated bonds according to the present invention include carbon-carbon double bond, carbon-carbon triple bond and carbon-nitrogen triple bond. Diene polymers having such hydrogenatable unsaturated bonds are preferably employed in the present invention. Such diene polymers include homopolymer and copolymer of conjugated diene, and copolymer of conjugated diene and unsaturated compound which can copolymerize with conjugated diene such as vinyl substituted aromatic hydrocarbon. Examples of such polymers include polybutadiene, polyisoprene, butadiene-styrene copolymer, butadiene-α-methylstyrene copolymer, butadiene-isoprene copolymer, polybutadiene grafted with a minor amount of styrene, butadiene-acrylonitrile copolymer, butadienevinyl-pyridine copolymer and others. The polymers obtained from butadiene are preferably used, because hydrogenation of butadienic units proceeds under mild conditions. These polymers may be prepared by bulk polymerization, solution polymerization or emulsion polymerization by the use of radical type initiator, ionic type initiator or Ziegler type initiator. The polymers having Moony Viscosity at 100° C. more than 20 be easily hydrogenated according to the present invention. The hydrogenated polymers obtained from such high Moony Viscosity polymers are useful for manufacturing rubber articles.

The catalyst of the present invention has so high activity for the hydrogenation of olefinically unsaturated bonds of polymers that the complete hydrogenation can be carried out under the mild condition such as atmospheric pressure of hydrogen and near the room temperature in a short time. Further, the aromatic nuclei can be hydrogenated under more severe condition.

The pressure of hydrogen used in the hydrogenation may be varied widely, but the selective hydrogenation of olefinically unsaturated bonds can be carried out at a temperature of from 0° to 120° C. and under a hydrogen pressure of less than 10 atms. It is one of the merits of the present invention that the selective hydrogenation of the unsaturated bonds of polymers proceeds easily in a viscous solution form in a high activity.

According to the invention, the concentration of the polymers to be hydrogenated in a solution may be varied from 1 to 30 weight percent, preferably from 1 to 25 weight percent. The viscosity of the polymer solution may be varied widely. From 0.05 to 5,000 poises, preferably from 1 to 2,000 poises, may be employed.

After hydrogenation, removal of solvent and catalysts from the hydrogenated polymers is easily carried out by adding polar solvent such as acetone and alcohol to the reaction mixture and precipitating the polymers, or pouring the reaction products into a steam or a hot water and removing solvent by azeotropic distillation. In these procedures, catalysts are decomposed and the major part of them is removed from the polymers, but the most effective removal of the catalysts is attained by contacting the reaction mixture with polar solvent or water containing a small amount of acid.

According to the present invention, polymers of high Moony Viscosity of even more than 40 can be easily hydrogenated under the mild condition wherein side reaction such as thermal degradation or gelation does not occur, and so the obtained polymers have no inferior properties resulted from the decrease of molecular weight or gel. For example, the hydrogenated styrene-butadiene random copolymer has higher green strength, resilience, oil extendability and heat resistance than the starting styrene-butadiene copolymer.

hydrogenated polymer having a high tensile strength was obtained after drying under a reduced pressure.

The infrared spectrum of the obtained hydrogenated polymers shows peaks at 721 cm.$^{-1}$ and 1,380 cm.$^{-1}$ assigned to $-(CH_2)_4-$ and $CH_3-$ of hydrogenated butadienic unit respectively, peaks at 967 cm.$^{-1}$ and 910 cm.$^{-1}$ assigned to trans-1,4-configuration and vinyl radical of butadienic unit respectively and peaks at 699 cm.$^{-1}$ and 757 cm.$^{-1}$ assigned to phenyl radical of styrenic unit, and no peaks in the range of from 820 to 900 cm.$^{-1}$ assigned to cyclohexyl radical.

These facts show that the selective hydrogenation of olefinically unsaturated bonds of the polymer was carried out.

In this example, the butadienic units of the styrene-butadiene random copolymer are hydrogenated completely by about 1,720 cm.$^3$ of hydrogen. The result of No. 1 in table 1 shows, for example, that about 82 percent of the butadienic units of the polymer was hydrogenated in 2 hours. As shown in No. 4, the hydrogenation of 69 percent of butadienic units of the polymer can be effected by the use of the low catalyst concentration of 1 mmole/l. and under an atmospheric pressure of hydrogen in 1 hour. This fact shows that the catalyst of the present invention has an extremely high activity.

TABLE 1

| No. | Catalyst preparation | | | | Hydrogenation | | Amount of hydrogen absorbed (ml.) | | | |
|---|---|---|---|---|---|---|---|---|---|---|
| | Metal chelate compound | Al/Ni or Co (molar ratio) | Temp. (° C.) | Reaction time (min.) | Temp. (° C.) | Catalyst conc. (mmol/l.) | 10 min. | 30 min. | 60 min. | 120 min. |
| 1 | Bis(salicylaldoxime) nickel | 6 | 23 | 5 | 50 | 3 | 31 | 131 | 636 | 1,413 |
| 2 | Bis(salicylaldoxime) cobalt | 4 | 50 | 30 | 50 | 4 | 112 | 245 | 351 | |
| 3 | Bis(8-hydroxyquinoline) cobalt | 3 | 80 | 5 | 50 | 3 | 698 | 1,068 | 1,245 | |
| 4 | Bis(8-hydroxyquinoline) nickel | 5 | 50 | 10 | 80 | 1 | 802 | 1,089 | 1,181 | |
| 5 | Tris($\alpha$-nitroso-$\beta$-naphthol) cobalt | 6 | 50 | 60 | 50 | 3 | 14 | 55 | 114 | |

Furthermore, this hydrogenated polymer can be processed by a roll or an extruder and compounded with a large amount of filler. The hydrogenated polybutadiene obtained by the process of the invention has an improved green strength, a low cold flow property and others.

These hydrogenated polymers of the present invention are easily curable by the conventional procedure and may be applied to the production of rubber articles.

The invention is illustrated in the greater detail in the following examples which are not intended, however, to be unduly limitative of the invention.

EXAMPLE 1

In a shakable glass reactor of 300 ml. capacity, 100 ml. of 5 weight percent toluene solution of solution-polymerized styrene-butadiene random copolymer (styrene/butadiene:18/82, ML-4 at 100° C.:45) was placed. After the atmosphere of the reactor was replaced by hydrogen, the catalyst prepared in the following manner was added to the polymer solution and then the atmospheric pressure of hydrogen was contacted with the solution under shaking and an amount of hydrogen absorbed was measured continuously by gas burette.

The catalyst was prepared by reacting metal chelate compound dispersed in toluene with triethylaluminium in an atmosphere of nitrogen. After the catalytic components were reacted, the black or brown homogeneous solution of the catalyst was obtained. The condition for preparing the catalyst and the condition of hydrogenation reaction and the amount of hydrogen absorbed in 10, 30, 60 and 120 minutes are shown in table 1.

In No. 1, 3 and 4, the introduction of hydrogen was stopped after 60 or 120 minutes and under stirring a small amount of acetone containing hydrochloric acid was added to the polymer solution and then the solution was mixed with a large amount of acetone to precipitate the polymer. White, rubbery

EXAMPLE 2

The same hydrogenation as shown in example 1 was repeated at 50° C. by the catalyst obtained by reacting 1.2 mmole of bis(8-hydroxyquinoline) nickel dispersed in toluene with 3.6 mmole of triethylaluminum at 24° C. and keeping for given times as described in the following table. The catalyst concentration was 3 mmole of nickel per 1 l. of the polymer solution to be hydrogenated. The amount of hydrogen absorbed in 10, 30 and 60 minutes is shown in table 2.

TABLE 2

| No. | Time kept at 24° C. (min.) | Amount of hydrogen absorbed (ml.) | | |
|---|---|---|---|---|
| | | 10 min. | 30 min. | 60 min. |
| 6 | 5 | 761 | 1,174 | [1] 1,237 |
| 7 | 60 | 736 | 1,175 | [2] 1,268 |
| 8 | 120 | 683 | 1,181 | 1,319 |

[1] Amount of hydrogen absorbed in 45 min.
[2] Amount of hydrogen absorbed in 50 min.

These results show that the catalyst of the present invention is very stable and the activity does not substantially decrease after 2 hours.

EXAMPLE 3

The same hydrogenation as shown in example 1 was repeated at 50° C. by means of the catalysts obtained from various catalytic components. In No. 9, a dispersion of 0.4 mmole of bis(8-hydroxyquinoline) nickel in toluene was reacted with 1.2 mmole of triethylaluminium. In No. 10, 0.4 mmole of nickel naphthenate was reacted with 1.2 mmole of triethylaluminium in the presence of 0.4 mmole of 1.7-octadiene. In No. 11, 0.4 mmole of bis(acetylacetone) nickel was reacted with 1.2 mmole of triethylaluminium. These catalytic components were reacted at 50° C. in an atmosphere of nitrogen and kept for 2 hours. The catalyst concentration was 3 mmole of nickel per 1 l. of 4polymer solution to be hydrogenated. The amount of hydrogen absorbed in 10, 30 and 60 minutes are shown in table 3.

TABLE 3

| No. | Catalyst | Amount of hydrogen absorbed (ml.) | | |
|---|---|---|---|---|
| | | 10 min. | 30 min. | 60 min. |
| 9 | Bis (8-hydroxyquinoline) nickel-triethylaluminium. | 658 | 1,210 | 1,397 |
| 10 | Nickelnaphthenate-1.7-octadiene-triethylaluminium. | 120 | 350 | 528 |
| 11 | Bis (acetylacetone) nickel-triethylaluminium. | 1 | 14 | 54 |

These results show that the stability of the catalyst obtained by the present invention is extremely excellent and also such valuable catalyst can be obtained from the metal chelate compound of which chelating agent is attached to the metal through a pair of a nitrogen atom and an oxygen atom.

EXAMPLE 4

The same hydrogenation as shown in example 1 was repeated at 50° C. by means of the catalyst obtained by reacting bis(8-hydroxyquinoline) nickel with n-butyllithium or diethylmagnesium. The catalyst concentration was 3 mmole of nickel per 1 l. of the polymer solution to be hydrogenated. The conditions for preparation of the catalyst and the hydrogenation reaction and the amount of hydrogen absorbed in 10, 30 and 60 minutes are shown in table 4.

TABLE 4

| | Catalyst preparation | | | | Amount of hydrogen absorbed (ml.) | | |
|---|---|---|---|---|---|---|---|
| No. | Organometallic compound | Li or Mg/Ni (molar ratio) | Reaction temp. (° C) | Reaction time (min.) | 10 min. | 30 min. | 60 min. |
| 12 | n-Butyllithium | 4 | 80 | 10 | 521 | 878 | 977 |
| 13 | do | 4 | 50 | 30 | 156 | 891 | 1,195 |
| 14 | do | 4 | 0 | 60 | 43 | 190 | 858 |
| 15 | Diethylmagnesium | 4 | 50 | 30 | 31 | 202 | 677 |
| 16 | do | 3 | 50 | 30 | 40 | 92 | 155 |

EXAMPLE 5

In the same reactor as used in example 1, 100 ml. of 5 weight percent toluene solution of high cis-polybutadiene (cis-1,4 configuration; 96.2 percent, trans-1,4:2.8 percent, 1,2:1.0 percent) or low cis-polybutadiene (cis-1,4 configuration; 35 percent, trans-1,4:55 percent, 1,2:10 percent) was placed. The hydrogenation was carried out at 80° C. in the same manner as shown in example 1. The catalyst was prepared by reacting a dispersion of metal chelate compound in toluene with the organometallic compound at 50° C. in an atmosphere of nitrogen. The molar ratio of the metal chelate compound to the organometallic compound was 1:3. The conditions for preparation of the catalyst and for hydrogenation and the amount of hydrogen absorbed in 10, 30 and 60 minutes are shown in table 5.

EXAMPLE 6

In a mechanically stirred autoclave, 7 volume percent solution of solution-polymerized styrene-butadiene random copolymer (styrene/butadiene:25/75, ML-4 at 100° C.:45) in n-hexane was catalytically hydrogenated at 50° C. under a hydrogen pressure of 10 kg./cm.$^2$. The catalyst was prepared by reacting bis(8-hydroxyquinoline) cobalt with triethylaluminium at 50° C. for 20 minutes, wherein the molar ratio of

TABLE 6

| | Original | Hydrogenated | Polymer |
|---|---|---|---|
| Degree of hydrogenation (percent) | | 15 | 35 |
| Polymer | 100 | | |
| Carbon black ISAF [a] | 50 | | |
| Aromatic oil | 10 | | |
| Stearic acid | 3 | | |
| Phenyl-β-naphthylamine | 1 | | |
| Sulfur | 1.5 | | |
| N-oxydiethylene-2-benzothiazole sulfenamde | 1.2 | | |
| Zinc oxide | 5 | | |

| After cured 145° C., 45 minutes | | | |
|---|---|---|---|
| Hardness (JIS) | 57 | 59 | 64 |
| Elongation (percent) | 550 | 345 | 300 |
| 300% modulus (kg./cm.$^2$) | 68 | 89 | 126 |
| Tensile strength (kg./cm.$^2$) | 200 | 215 | 232 |
| Resilience (percent) room temperature | 44 | 48 | 52 |
| 80° C. | 51 | 58 | 61 |
| 120° C. | 61 | 65 | 70 |
| Heat buildup (° C.) | 72 | 62 | 61 |
| Compression set (percent) [b] | 34 | 25 | 21 |
| Abrasion: | | | |
| By Pico method (cm.$^3 \times 10^{-3}$/80 times) | 14.8 | 13.5 | 9.6 |
| By Akron method (cm.$^3 \times 10^{-3}$/3 $\times 10^3$ times) | 74.9 | 58.0 | 44.2 |

[a] Abbreviation of Intermediate Super Abrasion Furnace.
[b] 30 percent, 22 hrs., 70° C.

bis(8-hydroxyquinoline cobalt to triethylaluminium was 1:3. The concentration of the catalyst was 1.5 mmole of cobalt per liter of the polymer solution to be hydrogenated.

Thus, hydrogenated polymers, which have different degree of hydrogenation based upon the theoretical value of 100 percent for the completely hydrogenated polymer, were prepared. The compounding recipe and physical properties of the hydrogenated and the original polymer are shown in table 6.

What is claimed is:
1. A process for the catalytic hydrogenation of an unsaturated polymer, which comprises reacting the hydrogenatable unsaturated bonds of the polymer in a solution of an inert solvent, said inert solvent being a saturated hydrocarbon, an aromatic hydrocarbon,

TABLE 5

| | Catalyst preparation | | Reaction time (min.) | Hydrogenation | | Amount of hydrogen absorbed (ml.) | | |
|---|---|---|---|---|---|---|---|---|
| No. | Metal chelate compound | Organo-metallic compound | | Polymer | Catalyst conc. (mmol/l.) | 10 min. | 30 min. | 60 min. |
| 17 | tris(8-hydroxyquinoline) iron | Triethylaluminium | 16 | Low cispolybutadiene | 4 | 125 | 170 | 191 |
| 18 | Bis(8-hydroxyquinoline) nickel | do | 30 | High cispolybutadiene | 3 | 672 | 1,125 | 1,325 |
| 19 | Bis(8-hydroxyquinoline) cobalt | do | 10 | Low cispolybutadiene | 4 | 683 | 1,181 | 1,418 |
| 20 | do | n-Butyllithium | 10 | do | 4 | 311 | | 350 | a hydroaromatic hydrocarbon, a chlorinated aromatic hydrocarbon or an ether, with hydrogen at a temperature of from 0° to 120° C. with a catalyst, the concentration of said polymer in said solution being from 1 to 30 percent by weight and said catalyst being produced by the reaction of 1. a metal chelate, said chelate being a hydroxyquinoline, a hydroxyoxime, a nitrosohydroxy aromatic compound, an aldehydeimine, an aromatic aminoacid or o-hydroxybenzilamine, and said metal being nickel, cobalt or iron; with 2. a metal compound reducing agent having the formula $MR_n$, wherein M is aluminum, magnesium or lithium, R is a hydrocarbon radical having from one to 12 carbon atoms and $n$ is the valence number of M, the molar ratio of (1) to (2) being from 1:0.2 to 1:10.

2. The process of claim 1, wherein said hydroxyquinoline is 8-hydroxyquinoline.

3. The process of claim 1, wherein said hydroxyoxime is salicylaldoxime.

4. The process of claim 1, wherein said nitrosohydroxy aromatic compound is α-nitroso-β-naphthol.

5. The process of claim 1, wherein said polymer is a diene polymer.

6. The process of claim 5, wherein said diene is butadiene.

7. The process of claim 5, wherein said diene polymer is a styrene-butadiene copolymer.

* * * * *